US011693127B2

(12) United States Patent
Farrell et al.

(10) Patent No.: US 11,693,127 B2
(45) Date of Patent: *Jul. 4, 2023

(54) RADIO FREQUENCY (RF) RANGING IN PROPAGATION LIMITED RF ENVIRONMENTS UTILIZING AERIAL VEHICLES

(71) Applicant: RTR Technologies, Loveland, CO (US)

(72) Inventors: David Farrell, Loveland, CO (US); Thomas Pattison, Kamuela, HI (US)

(73) Assignee: RTR Technologies, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,117

(22) Filed: Jan. 25, 2022

(65) Prior Publication Data
US 2022/0146692 A1      May 12, 2022

Related U.S. Application Data

(63) Continuation of application No. 16/875,501, filed on May 15, 2020, now Pat. No. 11,275,181.

(60) Provisional application No. 62/847,992, filed on May 15, 2019.

(51) Int. Cl.
G01S 19/46 (2010.01)
G01S 19/51 (2010.01)
G01S 19/11 (2010.01)

(52) U.S. Cl.
CPC ............. *G01S 19/46* (2013.01); *G01S 19/115* (2019.08); *G01S 19/51* (2013.01)

(58) Field of Classification Search
CPC .......... G01S 19/46; G01S 19/51; G01S 19/115
USPC ..................................... 342/357.29
See application file for complete search history.

(56) References Cited

U.S. PATENT DOCUMENTS 9,085,310 B2 *   7/2015   McKillican ............... G01S 5/14

FOREIGN PATENT DOCUMENTS

WO    WO-2018169443 A1 *  9/2018  ............. G01S 13/75

* cited by examiner

*Primary Examiner* — Harry K Liu
(74) *Attorney, Agent, or Firm* — Duft & Bornsen, PC

(57) ABSTRACT

The embodiments described herein provide ranging and location determination capabilities in RF-opaque environments, such as a jungle, that preclude the use of Global Positioning System (GPS) and/or laser ranging systems, utilizing transponders and Global Positioning System (GPS) receivers located on aerial vehicles. The aerial vehicles operate above the RF-opaque environment, and communicate with a ranging device within the RF-opaque environment on frequencies that propagate in the RF-opaque environment. The ranging device transmits RF signals to the transponders, which are received by the transponders and re-broadcasted back to the ranging device on a different frequency. The aerial vehicles also provide their coordinates to the ranging device using their GPS receivers. The ranging device uses information about the transmitted and received RF signals and the GPS coordinates of the aerial vehicles to calculate a perpendicular distance to a property line from the ranging device, and/or to calculate a coordinate location of the ranging device.

26 Claims, 10 Drawing Sheets

RADIO FREQUENCY (RF) RANGING IN PROPAGATION LIMITED RF ENVIRONMENTS UTILIZING AERIAL VEHICLES

CROSS REFERENCE TO RELATED APPLICATIONS

This patent application claims priority to, and thus the benefit of an earlier filing date from, U.S. patent application Ser. No. 16/875,501, filed on May 15, 2020, titled "RADIO FREQUENCY (RF) RANGING IN PROPAGATION LIMITED RF ENVIRONMENTS UTILIZING AERIAL VEHICLES, and further claims priority to U.S. Provisional Patent Application No. 62/847,992, filed on May 15, 2019 and titled "USE OF DRONES AND AUTONOMOUS VEHICLES IN RF RANGING", the entire contents of both which are hereby incorporated by reference.

FIELD

This disclosure relates to the field of RF ranging, and in particular, to implementing RF ranging in environments that often limit the propagation of RF, such as in high density foliage.

BACKGROUND

Outdoor survey work is often performed to locate the boundaries of a property. With the implementation of the Global Positioning System (GPS), this survey work has been made easier in most environments with surveyors utilizing GPS enabled receivers. However, some outdoor environments are RF-opaque to the frequencies that are in use in the GPS system, which operates at 1575.42 Megahertz (MHz) and 1227.60 MHz. One example of an outdoor environment that GPS does not perform well in is a jungle. In a jungle environment, the dense foliage can preclude the use of GPS, which makes the survey work more challenging. A jungle can also preclude the use of laser-based ranging, due to line-of-sight issues. Thus, it is desirable to implement ranging and location determination capabilities in these types of environments, as it improves the accuracy and the speed at which a survey can be performed.

SUMMARY

The embodiments described herein provide ranging and location determination capabilities in RF-opaque environments, such as a jungle, utilizing aerial vehicles that include transponders and Global Positioning System (GPS) receivers. The aerial vehicles operate above the RF-opaque environment, and are capable of determining their position via GPS. A ranging device operating on the ground in the RF-opaque environment transmits RF signals to the transponders using 30 Megahertz (MHz) to 1 Gigahertz (GHz) RF that can propagate through the RF-opaque environment, which are received by the transponders on the aerial vehicles and re-broadcasted back to the ranging device on a different frequency. The use of different transmit and receive frequencies by the ranging device allows the ranging device to analyze the RF signals without incurring transmission/receive overlap that may occur using a single frequency and a short ranging distance. The ranging device uses information about the transmitted and received RF signals to determine distances to the aerial vehicles, which, along with the GPS location information of the aerial vehicles derived from their GPS receivers, allows the ranging device to determine its location in the RF-opaque environment or a distance to some other object, such as a property line in the RF-opaque environment.

One embodiment comprises an apparatus that includes a range detector and at least one aerial vehicle. The range detector transmits RF signals at a first carrier frequency (f1), and receives RF signals at a second carrier frequency (f2) that is different than f1, where f1 and f2 are selected from frequencies of 30 MHz to 1 GHz. The at least one aerial vehicle includes a GPS receiver and a transponder, and operates proximate to first and second known coordinates of a property line. The at least one aerial vehicle determines its coordinates utilizing the GPS receiver, and provides its coordinates to the range detector. The range detector receives first coordinates of the at least one aerial vehicle in response to the at least one aerial vehicle operating proximate to the first known coordinates of the property line, broadcasts a first RF signal at f1, receives a first RF rebroadcast at f2 of the first RF signal from the transponder, and calculates a first distance from the range detector to the at least one aerial vehicle based on the first RF signal and the first RF rebroadcast. The range detector receives second coordinates of the at least one aerial vehicle in response to the at least one aerial vehicle operating proximate to the second known coordinates of the property line, broadcasts a second RF signal at f1, receives a second RF rebroadcast at f2 of the second RF signal from the transponder, and calculates a second distance from the range detector to the at least one aerial vehicle based on the second RF signal and the second RF rebroadcast. The range detector calculates a perpendicular distance to the property line based on the first and second distance, the first and second coordinates of the at least one aerial vehicle, and the first and second known coordinates of the property line.

Another embodiment comprises a method of determining a perpendicular distance to a property line. The method comprises operating at least one aerial vehicle proximate to first known coordinates of a property line, where the at least one aerial vehicle includes a transponder and a GPS receiver, determining first coordinates of the at least one aerial vehicle utilizing the GPS receiver, broadcasting a first RF signal at a first carrier frequency (f1), wherein f1 that is selected from frequencies of 30 MHz to 1 GHz, receiving a first RF rebroadcast of the first RF signal from the transponder, wherein the first RF rebroadcast is at a second carrier frequency (f2) that is different from f1, wherein f2 is selected from frequencies of 30 MHz to 1 GHz, and calculating a first distance to the at least one aerial vehicle based on the first RF signal and the first RF rebroadcast. The method further comprises operating the at least one aerial vehicle proximate to second known coordinates of the property line, determining second coordinates of the at least one aerial vehicle utilizing the GPS receiver, broadcasting a second RF signal at f1, receiving a second RF rebroadcast at f2 of the second RF signal from the transponder, calculating a second distance to the at least one aerial vehicle based on the second RF signal and the second RF rebroadcast, and calculating a perpendicular distance to the property line based on the first and second distance, the first and second coordinates of the at least one aerial vehicle, and the first and second known coordinates of the property line.

Another embodiment comprises a range detector and at least one aerial vehicle. The range detector transmits RF signals at a first carrier frequency (f1), and receives RF signals at a second carrier frequency (f2) that is different than f1, where f1 and f2 are selected from frequencies of 30

MHz to 1 GHz. The at least one aerial vehicle includes a GPS receiver and a transponder, where the at least one aerial vehicle is configured to determine its coordinates utilizing the GPS receiver, and to provide its coordinates to the range detector. The range detector, in response to the at least one aerial vehicle operating at each of a plurality of different locations, receives coordinates of the at least one aerial vehicle, broadcasts an RF signal at f1, receives an RF rebroadcast at f2 of the RF signal from the transponder, and calculates a distance from the range detector to the at least one aerial vehicle based on the RF signal and the RF rebroadcast. The range detector determines its coordinates based the distance calculated at each of the plurality of different locations.

Another embodiment comprises a method of determining coordinates of a range detector in an illustrative embodiment. The method comprises operating at least one aerial vehicle at each of a plurality of different locations, where the at least one aerial vehicle includes a transponder and a GPS receiver. In response to the at least one aerial vehicle operating at each of the plurality of different locations, the method comprises performing the steps of: receiving, by a range detector, coordinates of the at least one aerial vehicle utilizing the GPS receiver, broadcasting, by the range detector, a RF signal at a first carrier frequency (f1), wherein f1 that is selected from frequencies of 30 MHz to 1 GHz, receiving, by the range detector, a RF rebroadcast of the RF signal from the transponder, wherein the RF rebroadcast is at a second carrier frequency (f2) that is different from f1, wherein f2 is selected from frequencies of 30 MHz to 1 GHz, and calculating, by the range detector, a distance from the range detector to the at least one aerial vehicle based on the RF signal and the RF rebroadcast. The method further comprises determining, by the range detector, its coordinates based the distance calculated at each of the plurality of different locations.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
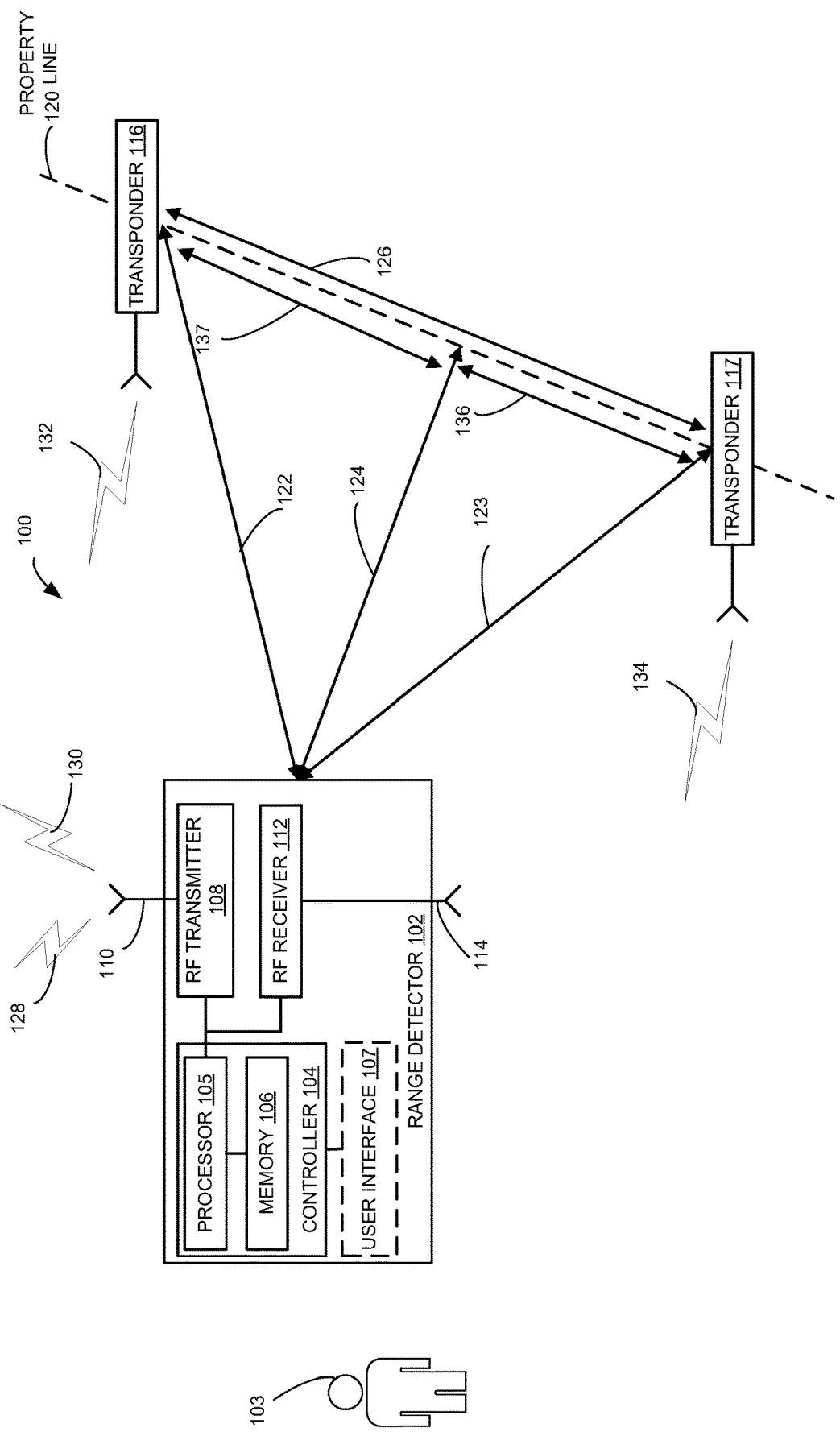
FIG. 1 is a block diagram of a RF ranging system in an illustrative embodiment.

FIG. 1 is a block diagram of an RF ranging system 100 in an illustrative embodiment. In this embodiment, RF ranging system 100 includes a range detector 102 that determines a perpendicular distance 124 to a property line 120 using two or more transponders 116-117 that are located on property line 120. Transponders 116-117 are separated from each other on property line 120 by a known distance 126. Transponder 116 is separated from range detector 102 by a distance 122, which is measured by range detector 102. Transponder 117 is separated from range detector 102 by a distance 123, which also is measured by range detector 102. In this embodiment, range detector 102 calculates a perpendicular distance 124 to property line 120 based on distances 122-123 and known distance 126 using a trigonometric relationship between the two right triangles that are formed.

In some embodiments, RF ranging system 100 utilizes Very High Frequency (VHF) ranges (e.g., RF ranges between 30 MHz to 300 MHz as defined by the International Telecommunication Union (ITU)) that more easily travel through RF-opaque environments, such as those found in a jungle. In addition to or instead of, RF ranging system 100 may also utilize lower frequency portions of Ultra High frequency (UHF) ranges (e.g., a lower frequency portion of RF ranges between 300 MHz to 3 GHz as defined by the International Telecommunication Union (ITU)). In particular, RF frequency ranges up to about 1 GHz may provide sufficient propagation performance in RF-opaque environments, such as those found in a jungle. With respect to UHF ranges in the United States, frequencies between 420 MHz and 450 MHz (i.e., the 70 centimeter (cm) band) and frequencies between 902 MHz and 928 MHz (i.e., the 23 cm band) may provide sufficient propagation through dense foliage while simplifying licensing requirements with the Federal Communication Commission (FCC) of the United States.

During a survey, utilizing VHF ranges (or lower frequency portions of UHF ranges) when utilizing RF ranging system 100 allows the surveyor to accurately and quickly survey a property when GPS does not function or laser ranging is not possible.

RAdio Detection And Ranging (RADAR) is an RF ranging system that is sometimes implemented at VHF ranges and/or UHF ranges. Different types of RADAR systems exist, including pulsed RADAR and Continuous-Wave (CW) RADAR. Pulsed RADAR systems emit a short RF transmit pulse and listens for an RF return. Typically, the RADAR transmitter is switched off after transmitting the RF transmit pulse and the RADAR receiver is switched on to listen for the RF return. However, RF ranging at shorter distances can cause the RF return pulse to overlap the RF transmit pulse. In this case, the RF return pulse may be missed, since the receiver is off when transmitting. Separate transmitters and receivers could be implemented on the same frequency, but this increases the complexity. Further, detecting the RF return pulse during the RF transmission pulse window may be difficult due to RF interference as the RF transmit pulse and the RF return pulse are at the same frequency.

CW RADAR systems emit a continuous RF carrier, and measure the Doppler shift of the RF return. Simple CW RADAR systems without frequency modulation cannot determine the range to the target because there are no timing references between the continuous RF carrier and the RF return. Frequency-Modulated (FM) CW RADAR systems emit a continuous RF carrier that is frequency modulated, and measure the frequency shift (and/or a phase shift) between the frequency modulated RF carrier and the RF return. The range to the target is based on the measured frequency (and/or phase) difference between the frequency modulated RF carrier and the RF return, with the range accuracy being based on a number of factors including how accurately the system can measure the frequency difference, how accurately the system can measure the delay time between the frequency modulated RF carrier and the RF return, and the frequency shift per unit of time used to modulate the carrier. Generally, FMCW RADAR systems that operate in VHF have an accuracy of a few meters, which is not accurate enough for survey work.

In this embodiment, RF ranging system 100 utilizes different transmit and receive frequencies, which allows RF ranging system 100 to isolate the outgoing RF transmit signal from the return RF receive signal. In RF ranging system 100, the use of a separate RF transmit and RF receive frequencies are enabled by transponders 116-117. While typical RADAR systems operate at the same frequency in the transmit portion and the receive portion (since the return signal in RADAR is a reflected echo of the transmit signal), RF ranging system 100 utilizes different frequencies for the transmit portion and the receive portion. This mitigates the transmit-return overlap issue discussed above. Also, the use of different frequencies for the transmit portion and the receive portion mitigates issues with recovering a return signal on the same frequency while the transmit signal is still in progress. In addition, for embodiments that utilize a lower frequency return signal than the transmit signal, the longer wavelength of the return signal allows for more samples to be obtained, which improves the accuracy. RF ranging system 100 also utilizes various techniques to improve the accuracy of ranging at VHF and/or the lower frequency portions of UHF, which often has a low accuracy due to the longer wavelength RF signals used. RF ranging system 100 therefore is able to mitigate problems associated with pulse RADAR and CW RADAR at VHF.

In the embodiments described, transponders 116-117 down-convert or up-convert the RF signal that transponders 116-117 receive from range detector 102, and re-broadcast a new RF signal back to range detector 102 at a different frequency. The use of the different RF transmit and RF receive frequencies mitigates some of the issues that are associated with VHF and/or UHF ranging, while enabling RF ranging system 100 to operate in various RF-opaque environments. Another problem associated with VHF and/or UHF ranging is accuracy. In some embodiments, RF ranging system 100 uses both wavelength delay information and phase delay information to more accurately determine a distance to a target (e.g., distances to transponders 116-117). This will be discussed later.

In this embodiment, range detector 102 includes a controller 104. Controller 104 includes any physical components, and/or physical systems, and/or physical devices that are capable of implementing the functionality described herein for range detector 102. While the specific physical implementation of controller 104 is subject to design choices, one particular embodiment may include one or more processors 105 coupled with a memory 106. Processor 105 includes any electronic circuits and/or optical circuits that are able to perform functions. The term "circuits" used herein refers to a physical implementation of hardware that is capable of performing the described functionality. Processor 105 may include one or more Central Processing Units (CPU), microprocessors, Digital Signal Processors (DSPs), Application-specific Integrated Circuits (ASICs), Programmable Logic Devices (PLDs), Field-Programmable Gate Arrays (FPGA), etc. Some examples of processors include INTEL® CORE™ processors, Advanced Risk Machines (ARM®) processors, etc.

Memory 106 includes any electronic circuits and/or optical circuits and/or magnetic circuits that are able to store data. For instance, memory 106 may store information regarding the transmitted and/or the received RF signal(s), which may then be used by processor 105 to determine distances 122-123 to transponders 116-117, respectively. Memory 106 may include one or more volatile or non-volatile Dynamic Random-Access Memory (DRAM) devices, FLASH devices, volatile or non-volatile Static RAM devices, hard drives, Solid State Disks (SSDs), shift registers, etc. Some examples of non-volatile DRAM and SRAM include battery-backed DRAM and battery-backed SRAM.

In some embodiments, range detector 102 may include a user interface 107. User interface 107 comprises any circuits, components, or devices that are capable of providing information to a user 103 of range detector 102. For instance, user interface 107 may comprise a visual display, a sound generating device, and/or a vibration generating device. User interface 107 may provide various types of information to user 103, such as perpendicular distance 124 to property line 120. For instance, user interface 107 may visually display perpendicular distance 124 to user 103, thereby allowing user 103 to determine when user 103 is proximate to property line 120. This visual representation may comprise textual or graphical information that enables user 103 to determine a relative proximity of range detector 102 to property line, and/or when user 103 is at or is proximate to property line 120. In addition to or instead of, user interface 107 may generate a sound that varies and/or is emitted when user 103 is proximate to and/or nearby property line 120. For instance, a frequency of the sound may increase or decrease as range detector 102 moves away or toward property line 120. In addition to or instead of, user interface 107 may generate a vibration that varies and/or is emitted when user 103 is proximate to and/or nearby property line 120. For instance, an intensity, a frequency, or a particular pattern of vibrations may be generated by user interface 107 as range detector 102 moves away or toward property line 120.

In this embodiment, range detector 102 further includes an RF transmitter 108 that is communicatively coupled with a transmit antenna 110. RF transmitter 108 includes any RF circuits, and/or electronic circuits, and/or optical circuits that are capable of transmitting RF signals. For instance, RF transmitter 108 may be capable of generating and modulating a carrier frequency in the VHF range (e.g., a carrier frequency around 151.5 MHz) and/or portions of the UHF range (e.g., a carrier frequency in the 70 cm band or the 23 cm band). Transmit antenna 110 typically is designed with a particular frequency or frequency range in mind. For instance, transmit antenna 110 may be designed to operate at or around 151.5 MHz, the 70 cm band, and/or the 23 cm band depending on the frequency and/or frequency range that RF transmitter 108 is capable of utilizing.

Range detector 102 in this embodiment also includes an RF receiver 112 that is communicatively coupled with a receive antenna 114. RF receiver 112 includes any RF circuits, and/or electronic circuits, and/or optical circuits that are capable of receiving RF signals. For instance, RF receiver 112 may be used to receive and/or demodulate a carrier frequency in the VHF range (e.g., a carrier frequency around 75.75 MHz) or in a lower frequency portion of the UHF range (e.g., a carrier frequency in the 70 cm or 23 cm band).

While the specific elements illustrated for range detector 102 have been shown in this embodiment as separate elements, other embodiments may combine the elements to achieve the same functionality. For instance, controller 104 may directly implement the functionality described herein for RF transmitter 108 and/or RF receiver 112.

Figure 2:
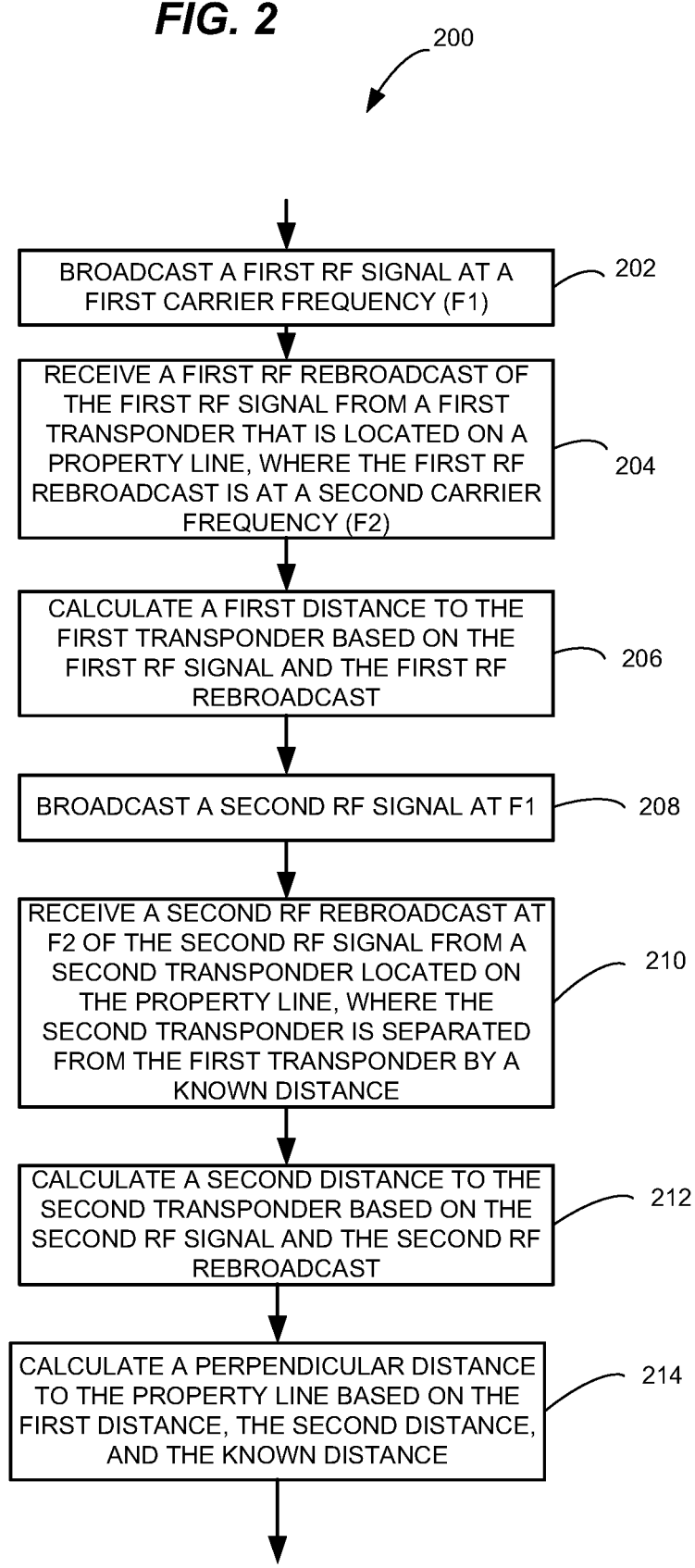
FIG. 2 is a flow chart of a method of determining a perpendicular distance to a property line in an illustrative embodiment.

Consider that RF ranging system 100 is in operation and that range detector 102 is located proximate to property line 120. FIG. 2 is a flow chart of a method 200 of determining a perpendicular distance to a property line in an illustrative embodiment. The methods described herein will be discussed with respect to RF ranging system 100, although the methods may be performed by other systems, not shown. The steps illustrated for the methods described herein may be performed in an alternate order. Also, the methods described herein may include other steps, not shown. Further, although specific examples are provided below with respect to RF activities in the UHF band, the performance of method 200 may utilize other bands as desired (e.g., the 70 cm or 23 cm band).

To begin a process to calculate distance 122 to transponder 116, processor 105 directs RF transmitter 108 to broadcast an RF signal 128 at a first carrier frequency (f1), in step 202. For example, processor 105 may generate a Barker code, and direct RF transmitter 108 to modulate a 151.5 MHz carrier (or a carrier in the 70 cm or 23 cm band) with the Barker code to broadcast RF signal 128. A Barker code (or Barker sequence) is a finite sequence of N values of +1 and −1 which have exceptional autocorrelation properties. Autocorrelation is the correlation of a signal with a delayed copy of itself as a function of delay. Autocorrelation is used by pulse RADAR, since the reflected RF return signal off of the target is a delayed copy of the RF transmitted signal. In RADAR, an autocorrelation is performed between the transmitted RF pulse signal and the reflected RF return signal to determine the delay between the transmitted RF pulse signal and the reflected RF return signal. The delay is used to calculate a distance to the target based on the speed of light through the transmission medium (e.g., through the atmosphere).

Cross-correlation is a measure of the similarity of two functions as a function of displacement of one relative to another. This is also known as a sliding dot product or sliding inner-product. Cross-correlation is similar to autocorrelation, with the difference being that the two signals that are cross-correlated are different signals. Cross-correlation is used by RF ranging system 100, since the targets (e.g., transponders 116-117) provide a delayed copy of the transmitted signal at a different frequency.

As discussed previously, Barker codes have excellent autocorrelation properties. Currently, only nine Barker codes are known. The shortest length N Barker code is two, and the longest length N is thirteen. Barker codes of length N equal to eleven and thirteen are used in direct-sequence spread spectrum and pulse compression radar systems because of their autocorrelation properties (e.g., the sidelobe level of amplitude of the Barker codes is 1/N compared to the peak signal). For instance, the peak-to-sidelobe ratio for an 11-bit Barker code is −20.8 dB, and the sidelobes have an equal magnitude.

In response to broadcasting RF signal 128 at f1, one of transponders 116-117 responds to RF signal 128. In one embodiment, RF signal 128 includes an address that indicates which of transponders 116-117 will respond to RF signal 128. This precludes both of transponders 116-117 from responding at the same time. However, other methods exist to preclude or mitigate the effects of having both of transponders 116-117 responding at the same time. For instance, each of transponders 116-117 may be configured to respond on different frequencies.

For purposes of discussion, assume that transponder 116 responds to RF signal 128. For instance, RF signal 128 may include an address that is associated with transponder 116. In response to transponder 116 receiving RF signal 128 from range detector 102, transponder 116 transmits an RF rebroadcast 132 of RF signal 128 on a second carrier frequency (f2) that is different from f1. For instance, transponder 116 may receive RF signal 128 from range detector 102, down-convert RF signal 128 from 151.5 MHz to a 75.75 MHz signal, and transmit a rebroadcast of RF signal 128 at 75.75 MHz. Down-converting may be performed in the analog domain and/or in the digital domain. For example, transponder 116 may utilize a digital downconverter to directly convert RF signal 128 at 151.5 MHz to 75.75 MHz, prior to transmitting RF rebroadcast 132. In addition to or instead of, transponder 116 may directly sample RF signal 128 to recover a datastream encoded by RF signal 128, and modulate an RF carrier at f2 using the datastream or a scaled version of the datastream. In some embodiments, RF signal 128 is modulated using a Barker code. The modulation may include amplitude modulation, frequency modulation, phase modulation, or some combination of amplitude modulation, frequency modulation, and phase modulation.

In response to the rebroadcast by transponder 116, processor 105 of range detector 102 receives RF rebroadcast 132 (e.g., via RF receiver 112), in step 204. For instance, RF receiver 112 may receive RF rebroadcast 132 at f2 (via receive antenna 114), and provide information regarding RF rebroadcast 132 to processor 105.

Processor 105 calculates distance 122 to transponder 116 based on RF signal 128 and RF rebroadcast 132, in step 206. Distance 122 may be calculated in a number of ways. For example, a cross-correlation may be performed between RF signal 128 and RF rebroadcast 132, which may provide information about distance 122. Phase differences between RF signal 128 and RF rebroadcast 132 may also provide information about distance 122. Timing information regarding when RF signal 128 is transmitted by range detector 102 and when RF rebroadcast 132 is received by range detector 102 may also provide information about distance 122.

Various mechanisms exist, and the previous examples are not to be considered as all-inclusive. Further, performing a cross-correlation process between RF signal 128 and RF rebroadcast 132 may include frequency scaling that normalizes RF signal 128 and/or the datastream used to modulate RF signal 128 with respect to RF rebroadcast 132. For example, if f2=f1/2, then processor 105 may down-convert the datastream used to modulate RF signal 128 by two prior to performing a cross-correlation with the datastream that modulates RF rebroadcast 132.

To begin a process to calculate distance 123, processor 105 directs RF transmitter 108 to broadcast an RF signal 130 at f1, in step 208. For example, processor 105 may generate a Barker code, and direct RF transmitter 108 to modulate a 151.5 MHz carrier with the Barker code to broadcast RF signal 130.

In response to broadcasting RF signal 130 at f1, one of transponders 116-117 responds to RF signal 130. For purposes of discussion, assume that transponder 117 responds to RF signal 130. For example, RF signal 130 may include an address associated with transponder 117. In response to transponder 117 receiving RF signal 130 from range detector 102, transponder 117 transmits an RF rebroadcast 134 of RF signal 130 at f2. For instance, transponder 117 may receive RF signal 130 from range detector 102, down-convert RF signal 130 broadcast by range detector 102 at 151.5 MHz to a 75.75 MHz signal, and transmit a rebroadcast of RF signal 130 at 75.75 MHz. Down-converting may be performed in the analog domain and/or in the digital domain. For example, transponder 116 may utilize a digital downconverter to directly convert RF signal 128 at 151.5 MHz to 75.75 MHz, prior to transmitting RF rebroadcast 132. In addition to, or instead of, transponder 117 may directly sample RF signal 130 to recover a datastream encoded by RF signal 130, and modulate an RF carrier at f2 using the datastream or a scaled version of the datastream. In some embodiments, RF signal 130 is modulated using a Barker code. The modulation may include amplitude modulation, frequency modulation, phase modulation, or some combination of amplitude modulation, frequency modulation, and phase modulation.

In response to the rebroadcast by transponder 117, processor 105 of range detector 102 receives RF rebroadcast 134 (e.g., via RF receiver 112), in step 210. For instance, RF receiver 112 may receive RF rebroadcast 134 at f2 (via receive antenna 114), and provide information regarding RF rebroadcast 134 to processor 105.

Processor 105 calculates distance 123 to transponder 117 based on RF signal 130 and RF rebroadcast 134, in step 212. Distance 123 may be calculated in a number of ways. For example, a cross-correlation may be performed between RF signal 130 and RF rebroadcast 134, which may provide information about distance 123. Phase differences between RF signal 130 and RF rebroadcast 134 may also provide information about distance 123. Timing information regarding when RF signal 130 is transmitted by range detector 102 and when RF rebroadcast 134 is received by range detector 102 may also provide information about distance 123. Various mechanisms exist, and the previous examples are not to be considered as all-inclusive. Further, performing a cross-correlation process between RF signal 130 and RF rebroadcast 134 may include frequency scaling that normalizes RF signal 130 and/or the datastream used to modulate RF signal 130 with respect to RF rebroadcast 134. For example, if f2=f1/2, then processor 105 may down-convert the datastream used to modulate RF signal 130 by two prior to performing a cross-correlation with the datastream that modulates RF rebroadcast 134

In response to calculating distance 122 and distance 123, processor 105 calculates perpendicular distance 124 to property line 120 based on distance 122, distance 123, and known distance 126, in step 214. This can be solved geometrically. For example, distance 122 squared is equal to perpendicular distance 124 squared plus distance 137 squared. Also, distance 123 squared is equal to perpendicular distance 124 squared plus distance 136 squared. Distance 122 and distance 123 have been calculated, and distance 126 is known. Since distance 126 is known, there is a relationship between distance 136 and distance 137. These relationships and the known and calculated values can be used to calculate perpendicular distance 124 by solving a system that has three simultaneous equations and three unknown variables.

Figure 3:
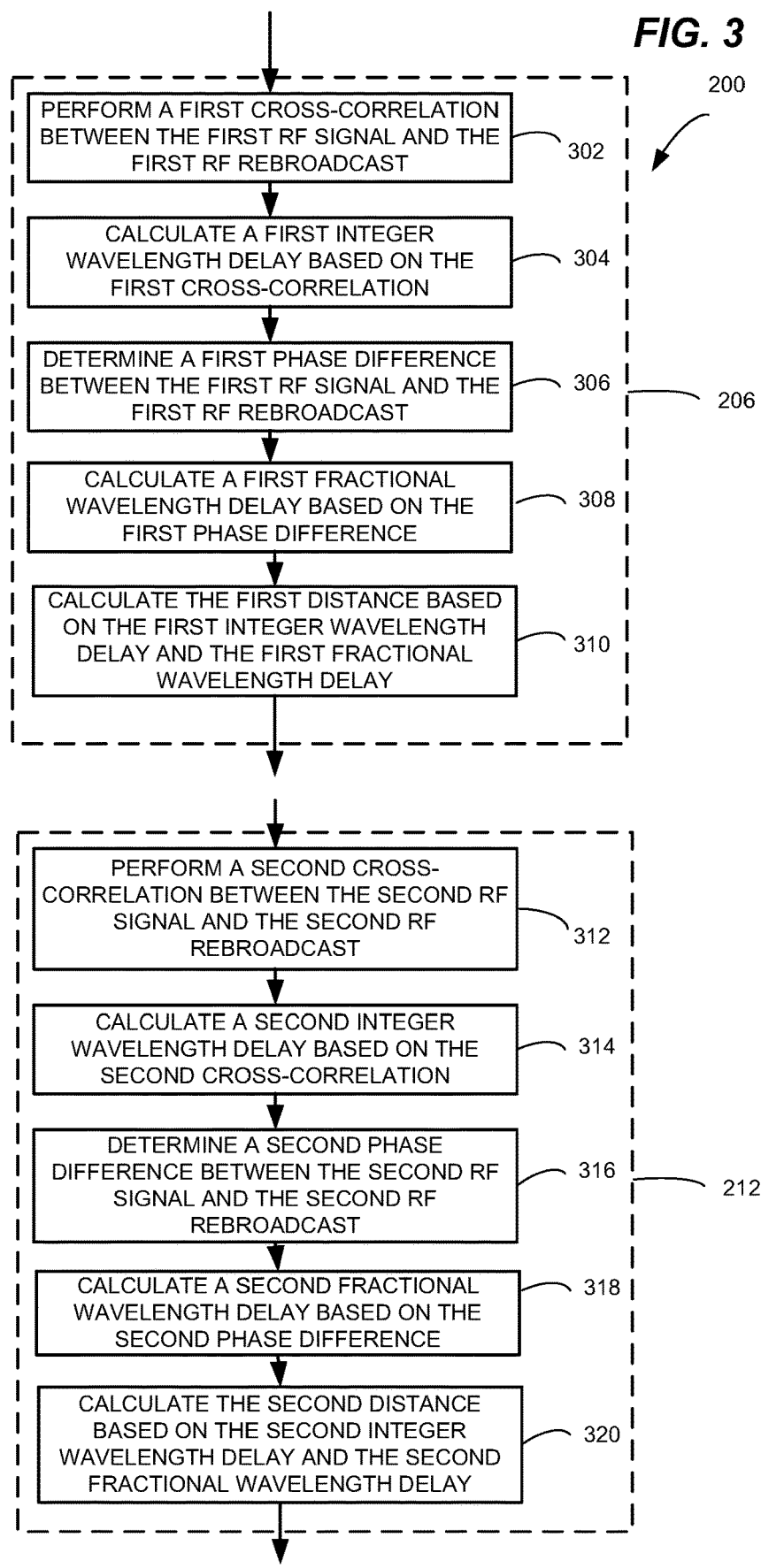
FIG. 3 illustrates additional steps of the method of FIG. 2 in an illustrative embodiment.

FIG. 3 illustrates additional steps of method 200 in an illustrative embodiment. In particular, the steps of FIG. 3 describe how an integer wavelength delay and a fractional phase delay may be calculated, which is one possible mechanism for calculating distances 122-123. As described herein, an integer wavelength delay is an integer number of wavelengths between either transponder 116 and range detector 102 (for distance 122), or transponder 117 and range detector 102 (for distance 123). Since two different wavelengths are used by RF ranging system 100, either can be used to represent the integer wavelength delay. There is no particular advantage of the choice of one over the other. Rather, it is a design choice. Choosing one wavelength over the other merely entails modifying either RF signals or the RF responses based on a relationship between f1 and f2 (e.g., using a scaling factor to normalize RF signals and RF responses with respect to each other).

To begin a process to calculate distance 122 between transponder 116 and range detector 102, processor 105 performs a cross-correlation between RF signal 128 and RF rebroadcast 132, in step 302. For example, if RF signal 128 and RF rebroadcast 132 are sampled at frequency $f_s$, then the cross-correlation between the samples of RF signal 128 and the samples of RF rebroadcast 132 generates a data sequence that can be analyzed. The data sequence will have a peak that identifies the lag of RF rebroadcast 132 with respect to RF signal 128. This lag is quantized, and is an integer unit of the sample period $1/f_s$. As discussed previously, RF signal 128 may be normalized with respect to RF rebroadcast 132 based on the relationship between f1 and f2. In some embodiments, RF signal 128 and/or RF rebroadcast 132 may be converted to an intermediate frequency prior to performing a cross-correlation.

Processor 105 calculates an integer wavelength delay based on the first correlation, in step 304. For example, since the speed of light in the atmosphere ($c_{atm}$) is known, a rough estimate of the round trip distance ($d_r$) between range detector 102 and transponder 116 is lag×($c_{atm}/f_s$).−(Δd× $c_{atm}$), where Δd is a delay time between when transponder 116 receives RF signal 128 and when transponder 116 transmits RF rebroadcast 132. Δd can be measured. Knowing the round trip distance $d_r$, an estimate of distance 122 between transponder 116 and range detector 102 is $d_r/2$+/− ($c_{atm}/f_s$).

Figure 4:
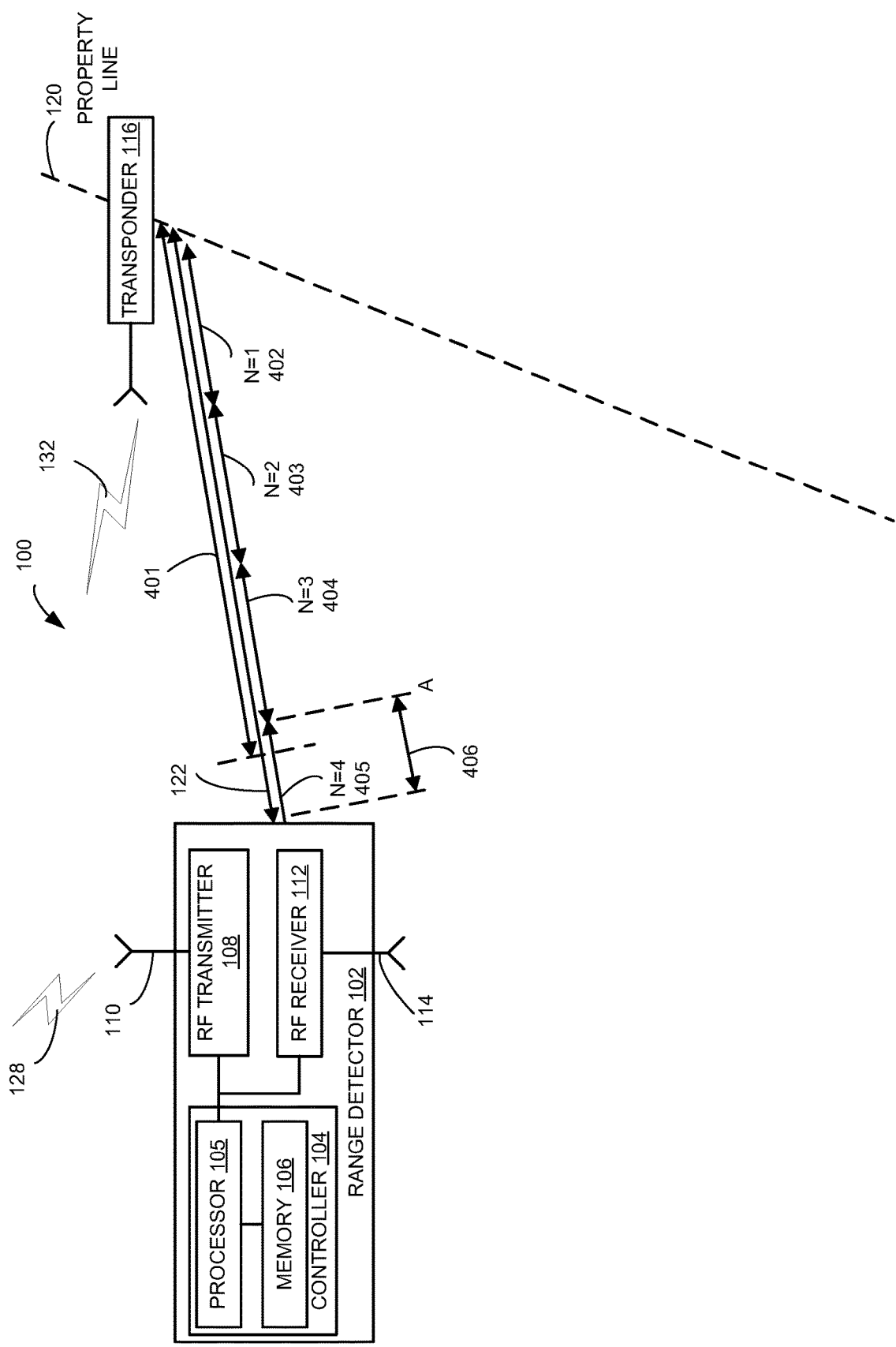
FIG. 4 illustrates an estimated distance between the range detector of FIG. 1 and the transponder of FIG. 1 in an illustrative embodiment.

FIG. 4 illustrates an estimated distance 401 between range detector 102 and transponder 116 in an illustrative embodiment. Estimated distance 401 has an accuracy of +/−($c_{atm}/f_s$). Typically this accuracy will not be sufficient by itself for a survey. For instance, the accuracy may be about +/−1 meter. However, +/−1 meter is sufficient to calculate the integer wavelength delay for distance 122 in terms of either f1 or f2, since $c_{atm}$, f1, f2, are known, and $d_s/2+/-(c_{atm}/f_s)$ can be calculated. For instance, the integer wavelengths 402-405 of f2 are illustrated in FIG. 4. Estimated distance 401 is illustrated as within integer wavelength 405 (N=4). Although estimated distance 401 has an error term, distances 402-404 are known, and are based on either f1 or f2. In the example, processor 105 would calculate the integer wavelength delay as three wavelengths, corresponding to distance 402+distance 403+distance 404. If f2 is used as a reference in the integer wavelength delay, then the distance represented by a 3 wavelength delay would correspond to a distance of $3\times(c_{atm}/f2)$. If f1 is used as a reference, the distance represented by a three wavelength delay would correspond to a distance of $3\times(c_{atm}/f1)$. Generally, the integer wavelength delay is the magnitude of (estimated distance 401)/($c_{atm}/f1$). or the magnitude of (estimated distance 401)/($c_{atm}/f2$), depending on whether f1 or f2 is used as a reference.

Figure 5:
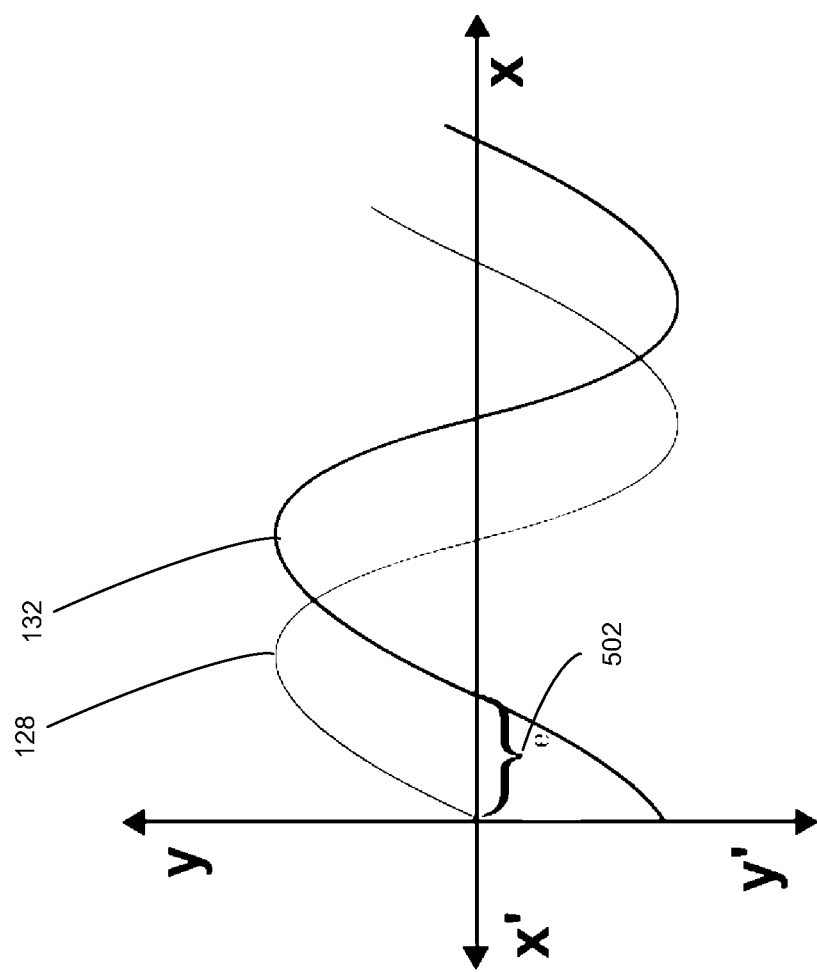
FIG. 5 illustrates an example of a phase difference between the RF signal of FIG. 1 and the RF rebroadcast of FIG. 1 in an illustrative embodiment.

Next, processor 105 calculates a phase difference between RF signal 128 and RF rebroadcast 132, in step 306. The phase difference can be used to calculate a fractional wavelength delay. FIG. 5 illustrates an example of a phase difference 502 between RF signal 128 and RF rebroadcast 132 in an illustrative embodiment. A fractional wavelength delay is one of the terms in a distance calculation (in addition to the integer wavelength delay) that is based on the phase difference between the carrier (f1) of RF signal 128 and the carrier (f2) of RF rebroadcast 132. Since the wavelengths of f1 and f2 are known, the fractional wavelength delay provides information regarding the sub-wavelength distance 406 (see FIG. 4) between point A and range detector 102. Each degree of phase shift corresponds to a distance of $1/360\times(c_{atm}/f2)$, if f2 is used as a reference, or $1/360\times(c_{atm}/f1)$ if f1 is used as a reference. Using information regarding f1, f2, and phase difference 502 between RF signal 128 and RF rebroadcast 132, processor 105 calculates the fractional wavelength delay, in step 308. The fractional wavelength delay is ((phase difference 502)/360)×1/f2, if f2 is used as reference, and ((phase difference 502)/360)×1/f1, if f1 is used as a reference. In some embodiments, RF signal 128 and/or RF rebroadcast 132 may be converted to an intermediate frequency prior to determining phase difference 502.

In response to calculating the integer wavelength delay ($int_d$) and the fractional wavelength delay, processor 105 calculates distance 122 between range detector 102 and transponder 116, in step 310. If f2 is used as a reference, then distance 122 would be (($int_d$)+((phase difference 502)/360))×($c_{atm}/f2$). If f1 is used as a reference, the distance 122 would be (($int_d$)+((phase difference 502)/360))×($c_{atm}/f1$).

For instance, if f2 is 75.75 MHz, $int_d$ is three (with respect to f2), phase difference 502 is 10 degrees, and $c_{atm}$ is $2.997\times10^8$ m/s, then distance 122 (reference to f2) would be $(3+10/360)\times(2.997\times10^8$ m/s$)/75.75\times10^6$, or 11.9792 meters.

Distance 123 can be calculated in a similar manner as distance 122, by performing steps 312-320 with respect to RF signal 130 and RF rebroadcast 134 to calculate distance 123 between range detector 102 and transponder 117. In particular, processor 105 performs cross-correlation between RF signal 130 and RF rebroadcast 134 in step 312, which may be similar to the process described in step 304. In some embodiments, RF signal 130 and/or RF rebroadcast 134 may be converted to an intermediate frequency prior to performing a cross-correlation.

Processor 105 may then calculate an integer wavelength delay based on the cross-correlation, in step 314, which may be similar to the process described in step 306. Processor 105 may further determine a phase difference between RF signal 130 and RF rebroadcast 134, in step 316, which may be similar to the process described in step 308. In some embodiments, RF signal 130 and/or RF rebroadcast 134 may be converted to an intermediate frequency prior to determining the phase difference. Using the phase difference, processor 105 calculates the fractional wavelength delay based on the phase difference, in step 318. Step 318 may be similar to the process described for step 308. Processor 105 may then calculate distance 123 based on the integer wavelength delay and the fractional wavelength delay calculated for RF signal 130 and RF rebroadcast 134, in step 320. Step 320 may be similar to the process described for step 310 above. Using values calculated for distances 122-123, processor 105 calculates perpendicular distance 124 using the Pythagorean theorem based on the relationships between distances 122-123 and known distance 126, in step 214.

RF ranging system 100 utilizes range detector 102 in coordination with transponders 116-117 to determine perpendicular distance 124 using RF ranging. This allows for a surveyor to efficiently and quickly identify a boundary of a property, such as illustrated at property line 120. When range detector 102 is in motion, range detector 102 may provide information regarding changes to perpendicular distance 124 as distances 122-123 change in real-time or near real-time. For example, range detector 102 may generate an alert when range detector 102 determines that perpendicular distance 124 is zero or approximately zero, which indicates to a surveyor that range detector 102 is on property line 120.

EXAMPLE

Figure 6:
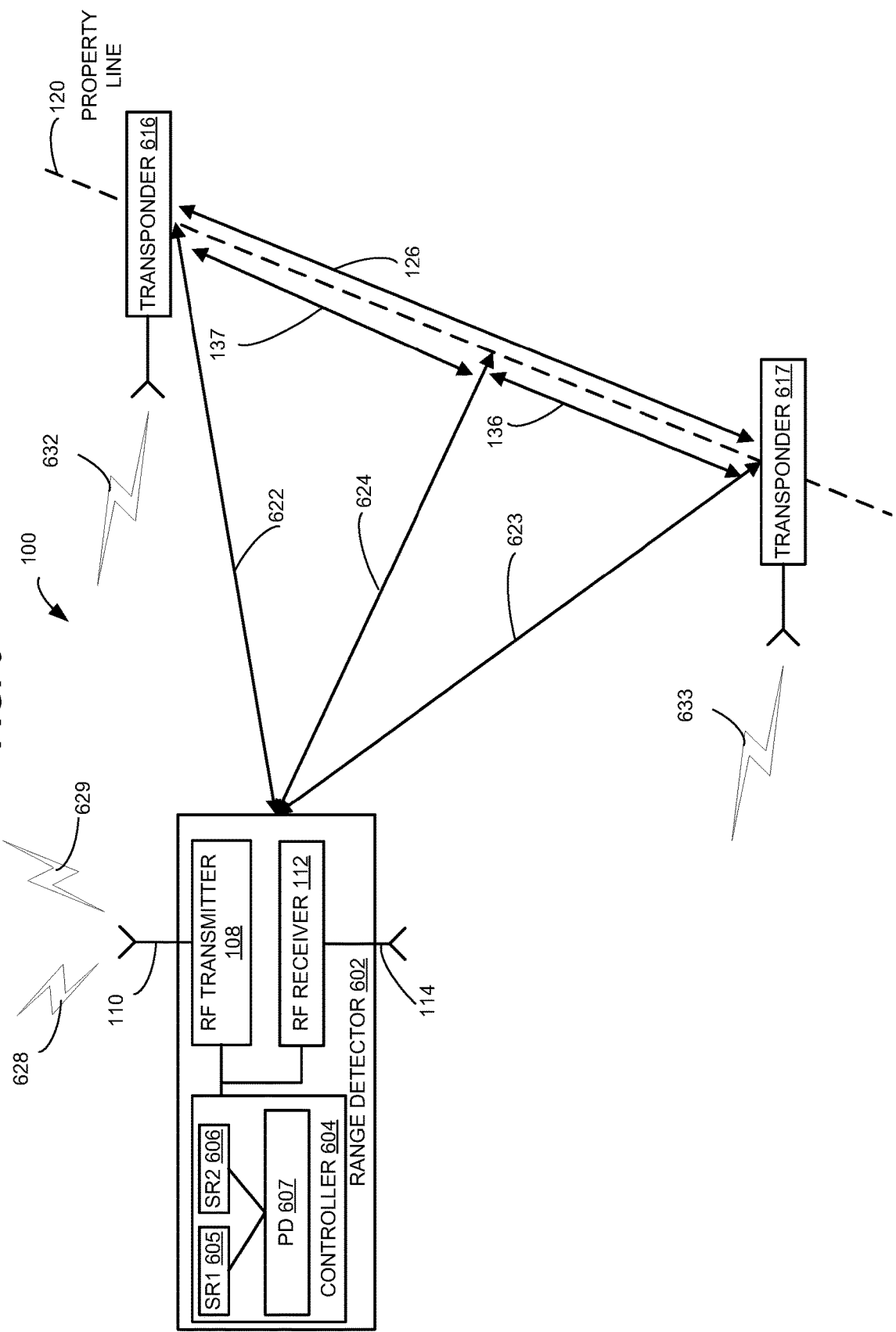
FIG. 6 is a block diagram of the RF ranging system of FIG. 1 in another illustrative embodiment.

The following example illustrates one possible implementation of some of the functionality described herein for RF ranging system 100. The example is not intended to limit the scope of the claims nor represent either a preferred embodiment or the only embodiment to implement the functionality described herein. As such, one of ordinary skill in the art will recognize that RF ranging system 100 may be implemented in different ways as a matter of design choice. In particular, the example will be described with respect to FIG. 6, which is a block diagram of ranging system 100 in another illustrative embodiment. In this embodiment, range detector 602 includes a controller 604. Controller 604 includes a first shift register 605, a second shift register 606, and a phase detector 607.

Range detector 602 sends a pulse sequence 628 consisting of a VHF carrier directly modulated by Barker codes. The use of a signal with a wavelength on the same order of magnitude or greater than the diameter of objects such as tree trunks or leaves, allow the radio signals to propagate through foliage with less multipath and attenuation than with higher frequencies commonly used for RADAR, for example. Leaves and trees generally have diameters of less than one meter. Therefore, the use of wavelengths of greater than 1 meter is advantageous for transmission and reception in a jungle environment.

Transponder 616 receives the modulated portion of the pulse sequence 628 using a threshold, and utilizes high speed circuitry to perform direct conversion. Transponder 616 divides the received sequence timing by two using high speed logic. The divided signals, which are at ½ the original frequency, are transmitted back to range detector 602 as RF rebroadcast 632. Transponder 616 utilizes a PLD that includes a high-speed deterministic data flow path to reduce latency and jitter in direct conversion.

Range detector 602 and transponders 616-617 utilize separate transmit and receive antennas for the original carrier and the ½ frequency signal. The separate antennas are orthogonally polarized to allow for full duplex operation. In addition, the separate antennas are resonate and selective for the frequency intended. Finally, the antennas consist of multiple elements to form a beam and provide directivity (e.g., more gain in the desired direction).

Range detector 602 receives the ½ frequency signal from transponder 616, which is directly sampled from RF rebroadcast 632 and captured in first shift register 605. Range detector 602 also simultaneously directly samples pulse sequence 628, which is captured in second shift register 606. The directly sampled signal from transponder 616 is also sent to a first input of a phase detector 607 consisting of an exclusive NOR gate. The transmit modulation Barker code carrier of range detector 602 is divided by two and is also sent to a second input of phase detector 607. Range detector 602 measures the time delay from its transmitted sequence to the received sequence two ways. First, phase detector 607 produces a pulse width modulated logic signal which is low pass filtered to remove the carrier frequency and produce a DC voltage proportional to the phase difference of transponder 616 and range detector 602 divided by two signals. The phase voltage is captured by an analog to digital converter (ADC, not shown). The ADC value is normalized to become the fractional wavelength delay (k). Further, first shift register 605 and second shift register 606 are auto-correlated mathematically. The correlation sequence exhibits a peak at a particular time. This can be used to determine the integral number of wavelength delays (n).

The total time delay then becomes nT+Kt, where T represents the period. The time delay is longer than the speed of light multiplied by the round trip distance. This is due to an offset caused by delays in the electronics of range detector 602 and transponder 616, and also by the index of refraction of the atmosphere. These two effects are linear and can be calibrated out by taking measurements at known distances. using d=mt+b, where d is the distance, t is the time delay measured, and b is the delay offset. Using the total time delay and the offset, range detector 602 can calculate distance 622 between transponder 616 and range detector 602. This process is repeated for transponder 617 to measure distance 623 based on pulse sequence 629 and RF rebroadcast 633. With distances 622-623 measured, range detector 602 can calculate perpendicular distance 624.

Figure 7:
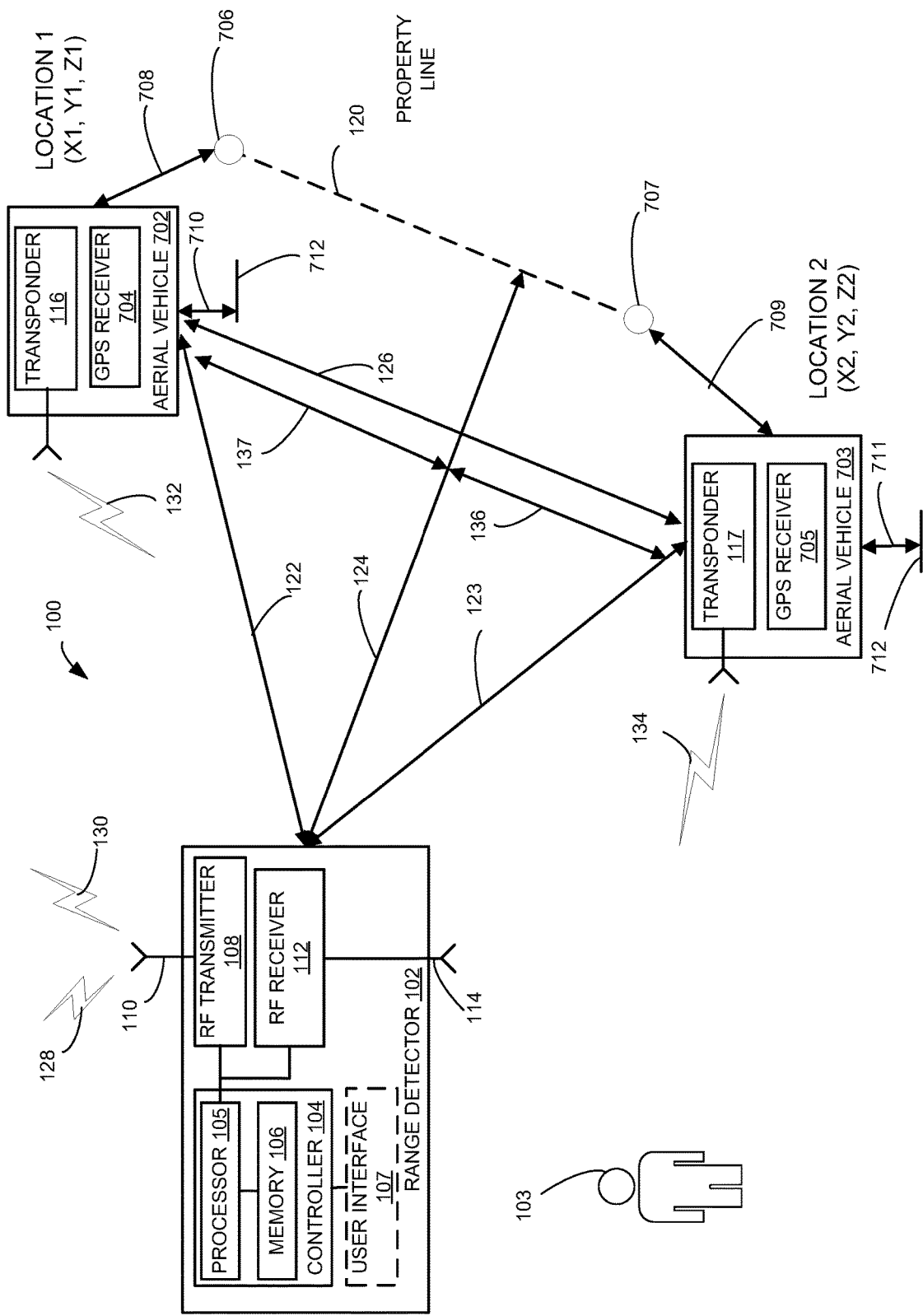
FIG. 7 is a block diagram of the RF ranging system of FIG. 1 in another illustrative embodiment.

FIG. 7 is a block diagram of RF ranging system 100 in another illustrative embodiment. In this embodiment, transponders 116-117 are mounted to aerial vehicles 702-703, respectively, which are located above and offset from known coordinates 706-707 of property line 120. For example, known coordinates 706-707 may comprise the corners of property line 120. Known coordinates 706-707 may be represented in a 3-D coordinate system. In some embodiments, aerial vehicles 702-703 comprise Unmanned Aerial Vehicles (UAVs), which may operate autonomously, under the direction of range detector 102, under the direction of user 103, or some combination thereof.

Although two aerial vehicles 702-703 are depicted in FIG. 7, RF ranging system 100 may utilize more or fewer aerial vehicles as a matter of design choice. For example, RF ranging system 100 may utilize one aerial vehicle (e.g., aerial vehicle 702) to perform the functionality of both aerial vehicles 702-703 by traveling between areas proximate to known coordinates 706-707 of property line 120 during a survey.

In this embodiment, aerial vehicles 702-703 include a Global Positioning System (GPS) receivers 704-705, respectively, which communicate with GPS satellites in orbit (not shown) to accurately provide location data to aerial vehicles 702-703. For example, aerial vehicles 702-703 may hover above foliage proximate to known coordinates 706-707 of property line 120, which allows aerial vehicles 702-703 to receive GPS signals and calculate their location in the 3-D coordinate system. In some embodiments, aerial vehicles 702-703 include additional sensors (not shown) that allow aerial vehicles 702-703 to calculate their respective heights 710-711 above the ground 712 with a higher degree of accuracy than may be derived from the GPS location data alone.

Typically, heavy foliage during a survey can render GPS receivers on the ground 712 unusable, but aerial vehicles 702-703 are capable of operating above the foliage in RF ranging system 100, thereby operating above the RF-opaque environment. Further, as the coordinates of known coordinates 706-707 of property line 120 are known in the 3-D coordinate system, distances 708-709 between aerial vehicles 702-703 and known coordinates 706-707, respectively, can be calculated based on the GPS derived 3-D location data for aerial vehicles 702-703 and known coordinates 706-707 of property line 120.

Transponders 116-117 are separated from each other by a computed distance 126, which may be calculated from the 3-D location data of aerial vehicles 702-703 derived from their GPS receivers 704-705. Aerial vehicle 702 is separated from range detector 102 by distance 122, which is measured by range detector 102 as previously described in prior embodiments. Aerial vehicle 703 is separated from range detector 102 by distance 123, which is also measured by range detector 102 as previously described in prior embodiments. Range detector 102 calculates perpendicular distance 124 to property line 120 based on the trigonometric and/or 3-D location data of aerial vehicles 702-703 (e.g., location one (x1, y1, z1) of aerial vehicle 702 and location two (x2, y2, z2) of aerial vehicle 703), known coordinates 706-707, distances 708-709, distances 136-137, and/or heights 710-711 of aerial vehicles 702-703 above the ground 712.

Figure 8:
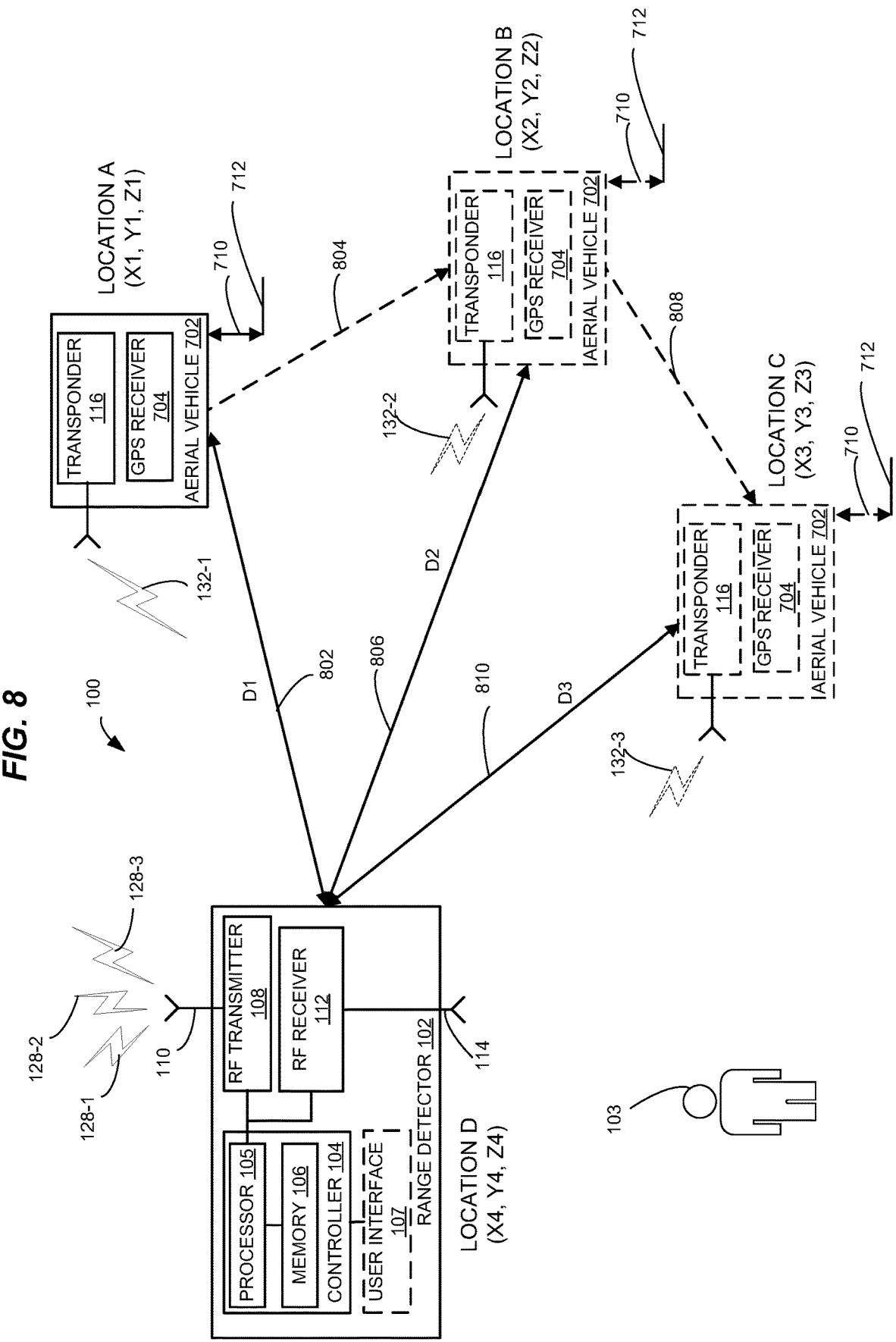
FIG. 8 is a block diagram of the RF ranging system of FIG. 1 in another illustrative embodiment.

FIG. 8 is a block diagram of RF ranging system 100 in another illustrative embodiment. In this embodiment, aerial vehicle 702 is used to calculate the location of range detector 102, (e.g., location D corresponding to coordinates x4, y4, z4 in the 3-D coordinate system) which is currently unknown. For example, range detector 102 may be in use on the ground 712 in dense foliage, which may preclude the use of GPS to determine the location of range detector 102 (and user 103). In this embodiment, distances d1-d3 between range detector 102 and aerial vehicle 702 are calculated by range detector 102 in response to aerial vehicle 702 moving between different locations A-C (e.g., above the foliage). The calculated distances d1-d3 and the coordinates of the different locations A-C generated via GPS receiver 704 are then used by range detector 102 to determine the coordinates at location D of range detector 102 in the 3-D coordinate system.

Aerial vehicle 702 begins at or moves to or proximate to location A, and determines its 3-D coordinates (x1, y1, z1) using GPS receiver 704. As discussed previously with respect to FIG. 7, aerial vehicle 702 may calculate height 710 above the ground 712 in order to improve the accuracy of the GPS information used to determine its 3-D coordinates (x1, y1, z1). Range detector 102 calculates distance 802 (d1) to aerial vehicle 702 using the techniques described for the previous embodiments (e.g., any of the previously described steps for calculating distances 122-123).

Aerial vehicle 702 then moves via path 804 to location B, and determines its coordinates (x2, y2, z2) using GPS receiver 704. Height 710 may also be used to improve the accuracy of the GPS information used to determine its 3-D coordinates (x2, y2, z2). In this embodiment, location B is different than location A. Range detector 102 calculates distance 806 (d2) to aerial vehicle 702 using the techniques described for the previous embodiments (e.g., any of the previously described steps for calculating distances 122-123).

Aerial vehicle 702 then moves via path 808 to location C, and determines its coordinates (x3, y3, z3) using GPS receiver 704. Height 710 may also be used to improve the accuracy of the GPS information used to determine its 3-D coordinates (x3, y3, z3). In this embodiment, location C is different than either location A or location B. Range detector 102 calculates distance 810 (d3) to aerial vehicle 702 using the techniques described for the previous embodiments (e.g., any of the previously described steps for calculating distances 122-123).

Distance 802 (d1), distance 806 (d2) and distance 810 (d3) are represented by the following formulas:

$$d_1^2 = (x_1 - x_4)^2 + (y_1 - y_4)^2 + (z_1 - z_4)^2$$
$$d_2^2 = (x_2 - x_4)^2 + (y_2 - y_4)^2 + (z_2 - z_4)^2$$
$$d_3^2 = (x_3 - x_4)^2 + (y_3 - y_4)^2 + (z_3 - z_4)^2$$

Solving for (x4, y4, z4), results in three systems of three equations and 3 unknowns:

System one:

$$x_4 = x_1 \pm \{d_1^2 - (y_1 - y_4)^2 - (z_1 - z_4)^2\}^{1/2}$$
$$x_4 = x_2 \pm \{d_2^2 - (y_2 - y_4)^2 - (z_2 - z_4)^2\}^{1/2}$$
$$x_4 = x_3 \pm \{d_3^2 - (y_3 - y_4)^2 - (z_3 - z_4)^2\}^{1/2}$$

System two:

$$y_4 = y_1 \pm \{d_1^2 - (x_1 - x_4)^2 - (z_1 - z_4)^2\}^{1/2}$$
$$y_4 = y_2 \pm \{d_2^2 - (x_2 - x_4)^2 - (z_2 - z_4)^2\}^{1/2}$$
$$y_4 = y_3 \pm \{d_3^2 - (x_3 - x_4)^2 - (z_3 - z_4)^2\}^{1/2}$$

System three:

$$z_4 = z_1 \pm \{d_1^2 - (y_1 - y_4)^2 - (x_1 - x_4)^2\}^{1/2}$$
$$z_4 = z_2 \pm \{d_2^2 - (y_2 - y_4)^2 - (x_2 - x_4)^2\}^{1/2}$$
$$z_4 = z_3 \pm \{d_3^2 - (y_3 - y_4)^2 - (x_3 - x_4)^2\}^{1/2}$$

The equations for system one, system two, and system three will yield two solutions due to the +/- terms. The solution which is common to all cases is the correct one.

An example is shown below in table below with the correct solution underlined:

TABLE 1

| position | Device | coordinate x | coordinate y | coordinate z | Dist. to range detector 102 |
|---|---|---|---|---|---|
| x1, y1, z1 | Aerial vehicle 702 | −11 | −3 | 22 | 28.07134 |
| x2, y2, z2 | Aerial vehicle 702 | −11 | 0 | 22 | 27.36786 |
| x3, y3, z3 | Aerial vehicle 702 | 13 | 9 | 29 | 27.94638 |
| x4, y4, z4 | Range Detector 102 | $x_4$ | $y_4$ | $z_4$ | |
| | | +solution | −solution | | |
| solution pos x1, y1, z1 | x4 | <u>7</u> | −29 | | |
| | y4 | <u>5</u> | −11 | | |
| | z4 | 42 | <u>2</u> | | |
| solution pos x2, y2, z2 | x4 | <u>7</u> | −29 | | |
| | y4 | <u>5</u> | −5 | | |
| | z4 | 42 | <u>2</u> | | |
| solution pos x3, y3, z3 | x4 | 19 | <u>7</u> | | |
| | y4 | 13 | <u>5</u> | | |
| | z4 | 56 | <u>2</u> | | |

Based on the example above, the location of range detector 102 is (7, 5, 2) in the coordinate system. In this example, the GPS coordinates of the transponders are translated to the East, North, Up (ENU) coordinate system. The location of the range detector in 3D space is then found using "true range multilateration" mathematics. The technique uses the multiple ranges (distances) between the range detector and the spatially-separated transponders at known locations to solve for the coordinates of the range detector. The ENU solution is then translated back into the GPS coordinate system to generate the resulting coordinates for range detector 102.

Although FIG. 8 has been described with respect to one aerial vehicle that moves, this embodiment may utilize two or more aerial vehicle as desired. For example, aerial vehicles 702-703 may be utilized, with one of aerial vehicles 702-703 moving to two of locations A-C during the calculations to determine the coordinates (x4, y4, z4) at location D of ranged detector 102, while the other aerial vehicle remains proximate to one of locations A-C. In another example, three aerial vehicle may be used, each of which may be proximate to one of locations A-C to determine the location of range detector 102.

Figure 9:
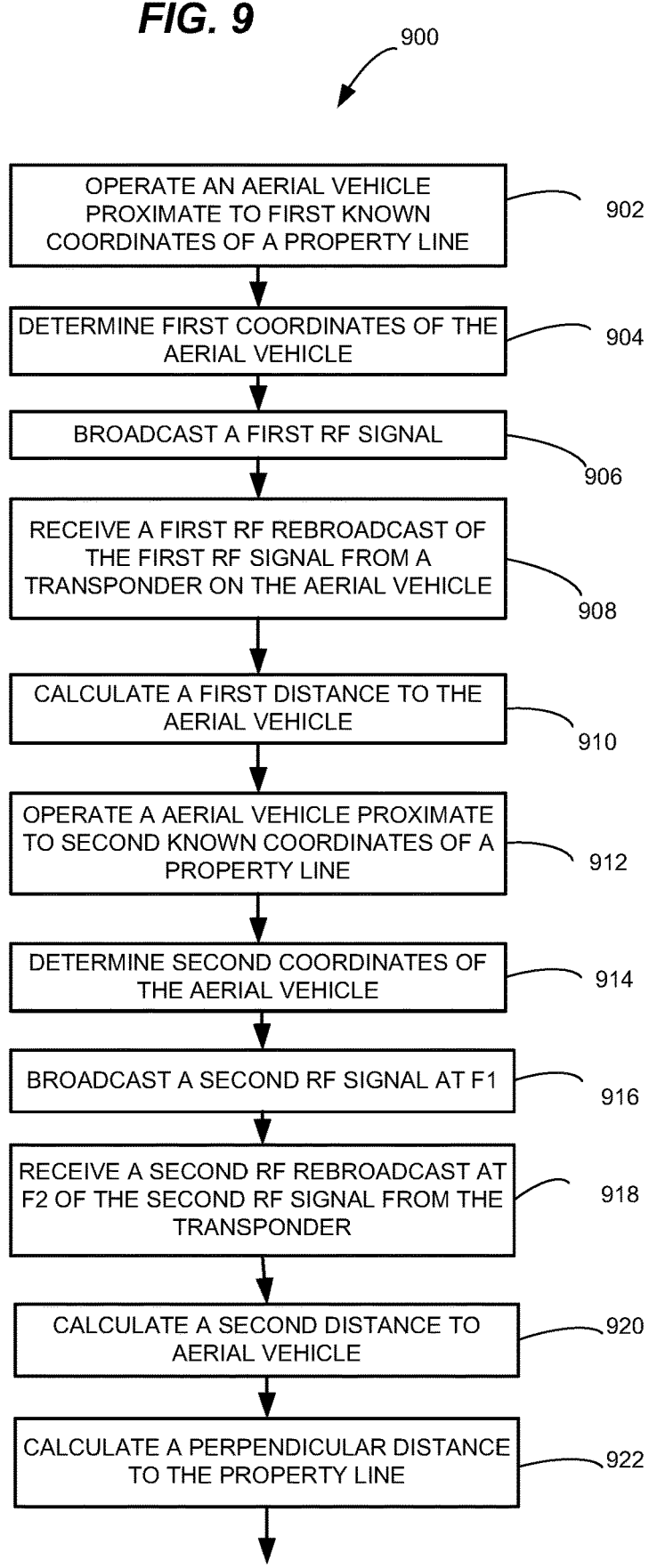
FIG. 9 is a flow chart of a method of determining a perpendicular distance to a property line in an illustrative embodiment.

FIG. 9 is a flow chart of a method 900 of determining a perpendicular distance to a property line in an illustrative embodiment. Method 900 will be discussed with respect to RF ranging system 100 of FIG. 7, although method 900 may be performed by other systems, not shown.

First, aerial vehicle 702 begins at or moves to location one proximate to known coordinates 706 of property line 120 (see step 902). For example, known coordinates 706 may be a corner of property line 120. Range detector 102 determines the coordinates (x1, y1, z1) of aerial vehicle 702 at location one (see step 904). For example, aerial vehicle 702 utilizes GPS receiver 704 to determine its coordinates (x1, y1, z1) in a 3-D coordinate system, and provides this information to range detector 102. As discussed previously, height 710 of aerial vehicle 702 above the ground 712 may be used to improve the accuracy of the GPS information used by aerial vehicle 702 to calculate its coordinates (x1, y1, z1).

Range detector 102 broadcasts RF signal 128 (e.g., with f1 at 427.5 MHz, see step 906), which may be the same or similar to step 202, previously described. Range detector 102 receives RF rebroadcast 132 (e.g., with f2 at 442.5 MHz), from transponder 116 on aerial vehicle 702 (see step 908). Step 908 may be similar to step 204, previously described. Range detector 102 calculates distance 122 to aerial vehicle 702 (see step 910), which may be similar to step 206, previously described. For example, step 910 may include some or all of the previously described steps 301-310 (see FIG. 3) for calculating integer wavelength delays and fractional wavelength delays.

Next, aerial vehicle 703 moves to location two proximate to known coordinates 707 of property line 120 (see step 912). For example, known coordinates 707 may be a different corner of property line 120. Range detector 102 determines the coordinates (x2, y2, z2) of aerial vehicle 703 at location two (see step 914). For example, aerial vehicle 703 utilizes GPS receiver 705 to determine its coordinates (x2, y2, z2) in the 3-D coordinate system, and provides this information to range detector 102. As discussed previously, height 711 of aerial vehicle 703 above the ground 712 may be used to improve the accuracy of the GPS information used to calculate its coordinates (x2, y2, z2).

Range detector 102 broadcasts RF signal 130 (e.g., with f1 at 427.5 MHz, see step 916), which may be the same or similar to step 208, previously described. Range detector 102 receives RF rebroadcast 134 (e.g., with f2 at 442.5 MHz), from transponder 117 on aerial vehicle 703 (see step 918). Step 918 may be similar to step 210, previously described. Range detector 102 calculates distance 123 to aerial vehicle 703 (see step 920), which may be similar to step 212, previously described. For example, step 920 may include some or all of the previously described steps 312-320 (see FIG. 3) for calculating integer wavelength delays and fractional wavelength delays.

Range detector 102 calculates a perpendicular distance 124 to property line 120 (see step 922). For example, range detector 102 may utilize distances 122-123, known coordinates 706-707, the GPS derived coordinates (x1, y1, z1 ; x2, y2, z2) of aerial vehicles 702-703, distances 708-709, distance 126, heights 710-711, or other information to calculate perpendicular distance 124 to property line 120.

Although method 900 has been described with respect to the use of two aerial vehicles 702-703, one aerial vehicle (e.g., aerial vehicle 702) may be used to perform the functions of both aerial vehicles 702-703. For example, aerial vehicle 702 may travel from location one to location two in order for steps 912-922 to be repetitively performed.

Figure 10:
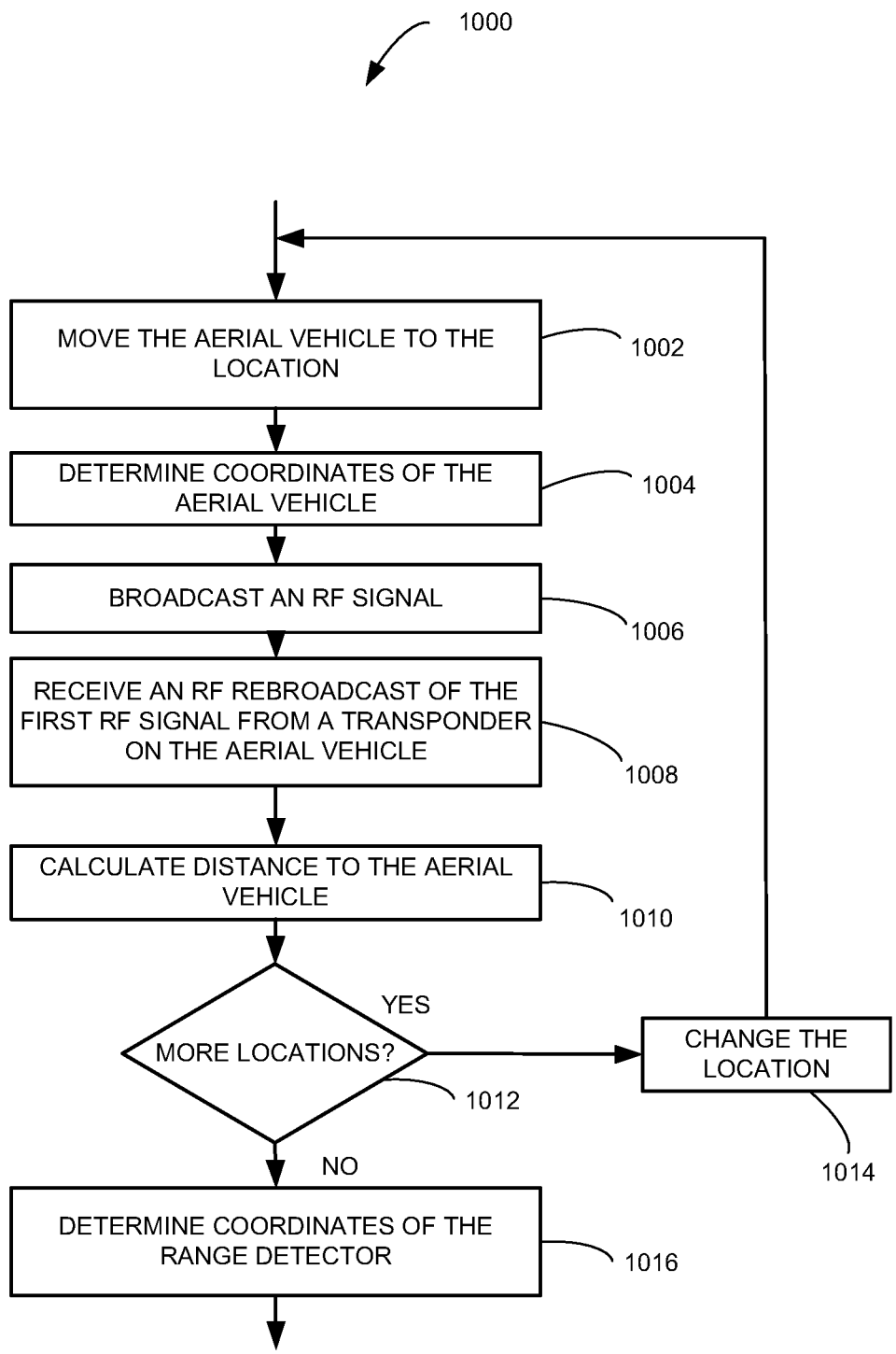
FIG. 10 is a flow chart of a method of determining the coordinates of a range detector in an illustrative embodiment.

FIG. 10 is a flow chart of a method 1000 of determining the coordinates of a range detector in an illustrative embodiment. Method 1000 will be discussed with respect to RF ranging system 100 of FIG. 8, although method 1000 may be performed by other systems, not shown. Step 1002 comprises initially moving aerial vehicle 702 proximate to location A. Proximate to location A, aerial vehicle 702 determines its 3-D coordinates (x1, y1, z1) using GPS receiver 704, which may be augmented by calculating height 710 of aerial vehicle 702 above the ground 712 (see step 1004). While aerial vehicle 702 is proximate to location A, range detector 102 broadcasts RF signal 128-1 (e.g., with f1 at 427 MHz, see step 1006), which may be similar to step 202 previously described. Range detector receives RF rebroadcast 132-1 from transponder 116 (e.g., with f2 at 442.5 MHz, see step 1008). Step 1008 may be similar to step 204, previously described. Range detector 102 calculates distance d1 based on RF signal 128-1 and RF rebroadcast 132-1 (see step 1010). For example, step 1010 may include some or all of the previously described steps 301-310 (see FIG. 3) for calculating integer wavelength delays and fractional wavelength delays as part of the distance calculation.

In step 1012, a determination is made if aerial vehicle 702 is to move to additional locations. As only location A and distance d1 has been calculated so far, step 1014 is performed to change to the next location B. Aerial vehicle 702 moves proximate to location B via path 804, and steps 1004-1010 are repeated using RF broadcast 128-2, RF rebroadcast 132-2, coordinates x2, y2, z2) to determine distance d2. In this embodiment, location C and distance d3 remain, so step 1014 is performed to change to the next location B. Aerial vehicle 702 moves proximate to location C via path 808, and steps 1004-1010 are repeated using RF broadcast 128-3, RF rebroadcast 13232, coordinates x3, y3, z3) to determine distance d3.

If no more locations remain for analysis, range detector 102 determines its coordinates x4, y4, z4 at location D using d1, d2, and d3 (see step 1016). In some embodiments, more or fewer locations may be analyzed by performing steps 1004-1010 when determining the coordinates x4, y4, z4 at location D.

Although method 1000 has been described using one aerial vehicle 702, additional aerial vehicles may be used in other embodiments, which would preclude some or all of the location changes previously described for aerial vehicle 702 (e.g., three aerial vehicles may be used, one proximate to each of locations A-C). Further, the aerial vehicles described herein may operate autonomously, under direction of range detector 102, and/or under direction of user 103 in different embodiments.

Although various RF techniques may be employed by RF ranging system 100 in order to calculate distances from range detector 102 to transponders 116-117, and aerial vehicles 702-703, when they include transponders 116-117, specialized techniques may be used when f1 and f2 are separated in frequency by a small amount (e.g., a few MHz). In this case, phase locked frequency mixing can be employed. For example, range detector 102 may utilize a frequency mixer to shift its original base-band signal to f1, which is the transmit frequency of range detector 102. Next, transponders 116-117 utilize a phase locked homodyne method to first shift their received frequency f1 to baseband, and then utilize a frequency mixer to shift the base-band signal up to the transmit frequency of transponders 116-117, which is f2. Range detector 102 utilizes a phase locked homodyne method to shift its received frequency f2 to base-band to compute the coarse delay nT relative to its original base-band signal. The phase lock circuitry also provides the necessary information for phase comparison of the transmit and received carrier frequencies used by range detector 102 to determine the fine delay Kt.

The use of aerial vehicle that operate above RF-opaque environments enables range detector 102 to calculate its location and/or to calculate a distance and/or vector from range detector 102 to another 3-D coordinate in the surrounding environment, such as a property line or a point in the 3-D coordinate system. These activities provide a technical benefit of enabling survey and/or location capabilities in environments that preclude the use of GPS and/or laser ranging, such as a jungle, thereby improving the art.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. An apparatus comprising:
a range detector configured to transmit Radio Frequency (RF) signals at a first carrier frequency (f1), and to receive RF signals at a second carrier frequency (f2) that is different than f1; and
a Global Positioning System (GPS) receiver coupled with a transponder, and configured to operate proximate to first known coordinates and second known coordinates, and to determine coordinates of the GPS receiver, wherein the transponder is configured to provide the coordinates of the GPS receiver to the range detector, wherein the range detector is configured to broadcast a first RF signal at f1, to receive a first RF rebroadcast at f2 of the first RF signal from the transponder operating proximate to the first known coordinates, to calculate a first distance from the range detector to the transponder based on the first RF signal and the first RF rebroadcast, and to receive first coordinates of the GPS receiver,
wherein the range detector is configured to broadcast a second RF signal at f1, to receive a second RF rebroadcast at f2 of the second RF signal from the transponder operating proximate to the second known coordinates, to calculate a second distance from the range detector to the transponder based on the second RF signal and the second RF rebroadcast, and to receive second coordinates of the GPS receiver,
wherein the range detector is further configured to calculate a position of a point of interest at the range detector relative to the first known coordinates and the second known coordinates based on the first distance and the second distance, the first coordinates and the second coordinates of the GPS receiver, and the first known coordinates and the second known coordinates.

2. The apparatus of claim 1 wherein:
the range detector is further configured to receive the first coordinates of the GPS receiver in the first RF rebroadcast from the transponder, and to receive the second coordinates of the GPS receiver in the second RF rebroadcast from the transponder.

3. The apparatus of claim 1, wherein:
f1 and f2 each have frequency that is selected from a 23 cm band or a 70 cm band.

4. The apparatus of claim 1, wherein:
the range detector is further configured to perform a first correlation between the first RF signal and the first RF rebroadcast, to calculate a first integer wavelength delay based on the first correlation, and to calculate the first distance based on the first integer wavelength delay; and
the range detector is further configured to perform a second correlation between the second RF signal and the second RF rebroadcast, to calculate a second integer wavelength delay based on the second correlation, and to calculate the second distance based on the second integer wavelength delay.

5. The apparatus of claim 4, wherein:
the range detector is further configured to determine a first phase difference between the first RF signal and the first RF rebroadcast, to calculate a first fractional wavelength delay based on the first phase difference, and to calculate the first distance based on the first integer wavelength delay and the first fractional wavelength delay; and
the range detector is further configured to determine a second phase difference between the second RF signal and the second RF rebroadcast, to calculate a second fractional wavelength delay based on the second phase difference, and to calculate the second distance based on the second integer wavelength delay and the second fractional wavelength delay.

6. The apparatus of claim 1, wherein:
the first RF signal and the second RF signal comprise a pulse sequence that is modulated by a Barker code;
the first RF rebroadcast comprises a pulse sequence that is modulated based on the Barker code of the first RF signal; and
the second RF rebroadcast comprises a pulse sequence that is modulated based on the Barker code of the second RF signal.

7. The apparatus of claim 1, wherein:
the GPS receiver is mounted onto an Unmanned Aerial Vehicle (UAV).

8. A method comprising:
operating a Global Positioning System (GPS) receiver coupled with a transponder, proximate to first known coordinates;
determining first coordinates of the GPS receiver;
broadcasting, from a range detector, a first Radio Frequency (RF) signal at a first carrier frequency (f1);
receiving, at the range detector, a first RF rebroadcast of the first RF signal from the transponder operating proximate to the first known coordinates, wherein the first RF rebroadcast is at a second carrier frequency (f2) that is different from f1;
calculating a first distance from the range detector to the transponder based on the first RF signal and the first RF rebroadcast;
operating the GPS receiver proximate to second known coordinates;
determining second coordinates of the GPS receiver;
broadcasting, from the range detector, a second RF signal at f1;
receiving, at the range detector, a second RF rebroadcast at f2 of the second RF signal from the transponder operating proximate to the second known coordinates;

calculating a second distance from the range detector to the transponder based on the second RF signal and the second RF rebroadcast; and
calculating a position relative to the first known coordinates and the second known coordinates based on the first distance and the second distance, the first coordinates and the second coordinates of the GPS receiver, and the first known coordinates and the second known coordinates.

9. The method of claim 8 further comprising:
receiving, at the range detector, the first coordinates of the GPS receiver in the first RF rebroadcast from the transponder; and
receiving, at the range detector, the second coordinates of the GPS receiver in the second RF rebroadcast from the transponder.

10. The method of claim 8, wherein:
broadcasting the first RF signal and the second RF signal at f1 further comprises:
  broadcasting at a frequency of f1 that is selected from a 23 cm band or a 70 cm band; and
receiving the first RF rebroadcast and the second RF rebroadcast at f2 further comprises:
  receiving at a frequency of f2 that is selected from frequencies from the 23 cm band or the 70 cm band.

11. The method of claim 8, wherein:
calculating the first distance further comprises:
  performing a first correlation between the first RF signal and the first RF rebroadcast;
  calculating a first integer wavelength delay based on the first correlation; and
  calculating the first distance based on the first integer wavelength delay; and
calculating the second distance further comprises:
  performing a second correlation between the second RF signal and the second RF rebroadcast;
  calculating a second integer wavelength delay based on the second correlation; and
  calculating the second distance based on the second integer wavelength delay.

12. The method of claim 11, wherein:
calculating the first distance further comprises:
  determining a first phase difference between the first RF signal and the first RF rebroadcast;
  calculating a first fractional wavelength delay based on the first phase difference; and
  calculating the first distance based on the first integer wavelength delay and the first fractional wavelength delay; and
calculating the second distance further comprises:
  determining a second phase difference between the second RF signal and the second RF rebroadcast;
  calculating a second fractional wavelength delay based on the second phase difference; and
  calculating the second distance based on the second integer wavelength delay and the second fractional wavelength delay.

13. The method of claim 8, wherein:
broadcasting the first RF signal and the second RF signal comprises:
  modulating a carrier with a Barker code to broadcast a pulse sequence;
receiving the first RF rebroadcast comprises:
  receiving a carrier that is modulated based on the Barker code of the first RF signal; and receiving the second RF rebroadcast comprises:
  receiving a carrier that is modulated based on the Barker code of the second RF signal.

14. The method of claim 8, wherein:
the GPS receiver is mounted onto an Unmanned Aerial Vehicle (UAV).

15. An apparatus comprising:
a range detector configured to transmit RF signals at a first carrier frequency (f1), and to receive RF signals at a second carrier frequency (f2) that is different than f1; and
a Global Positioning System (GPS) receiver coupled with a transponder, and configured to determine coordinates of the GPS receiver, wherein the transponder is configured to provide the coordinates of the GPS receiver to the range detector,
wherein the range detector is further configured, in response to the GPS receiver operating at each of a plurality of different locations, to receive the coordinates of the GPS receiver, to broadcast an RF signal at f1, to receive an RF rebroadcast at f2 of the RF signal from the transponder, and to calculate a distance from the range detector to the transponder based on the RF signal and the RF rebroadcast,
wherein the range detector is further configured to determine coordinates of the range detector based the distance calculated at each of the plurality of different locations.

16. The apparatus of claim 15, wherein:
f1 and f2 each have frequency that is selected from a 23 cm band or a 70 cm band.

17. The apparatus of claim 15, wherein:
the range detector is further configured to perform a correlation between the RF signal and the RF rebroadcast, to calculate an integer wavelength delay based on the correlation, and to calculate the distance based on the integer wavelength delay.

18. The apparatus of claim 17, wherein:
the range detector is further configured to determine a phase difference between the RF signal and the RF rebroadcast, to calculate a fractional wavelength delay based on the phase difference, and to calculate the distance based on the integer wavelength delay and the fractional wavelength delay.

19. The apparatus of claim 15, wherein:
the RF signal comprise a pulse sequence that is modulated by a Barker code, and
the RF rebroadcast comprises a pulse sequence that is modulated based on the Barker code of the RF signal.

20. The apparatus of claim 15, wherein:
the GPS receiver is mounted onto an Unmanned Aerial Vehicle (UAV).

21. A method comprising:
in response to operating a Global Positioning System (GPS) receiver coupled with a transponder at each of a plurality of different locations, performing the steps of:
  receiving, by a range detector, coordinates of the GPS receiver;
  broadcasting, by the range detector, a Radio Frequency (RF) signal at a first carrier frequency (f1);
  receiving, by the range detector, a RF rebroadcast of the RF signal from the transponder, wherein the RF rebroadcast is at a second carrier frequency (f2) that is different from f1; and
  calculating, by the range detector, a distance from the range detector to the transponder based on the RF signal and the RF rebroadcast; and determining, by the range detector, coordinates of the range detector based the distance calculated at each of the plurality of different locations.

22. The method of claim 21, wherein:
broadcasting the RF signal further comprises:
   broadcasting at a frequency of f1 that is selected from a 23 cm band or a 70 cm band; and
receiving the RF rebroadcast at f2 further comprises:
   receiving at a frequency of f2 that is selected from frequencies from the 23 cm band or the 70 cm band.

23. The method of claim 21, wherein calculating the distance further comprises:
performing a first correlation between the RF signal and the RF rebroadcast;
calculating a first integer wavelength delay based on the first correlation; and
calculating the distance based on the first integer wavelength delay.

24. The method of claim 23, wherein calculating the distance further comprises:
determining a phase difference between the RF signal and the RF rebroadcast;
calculating a fractional wavelength delay based on the phase difference; and
calculating the distance based on the integer wavelength delay and the fractional wavelength delay.

25. The method of claim 21, wherein:
broadcasting the RF signal comprises:
   modulating a carrier with a Barker code to broadcast a pulse sequence; and
receiving the RF rebroadcast comprises:
   receiving a carrier that is modulated based on the Barker code of the RF signal.

26. The method of claim 21, wherein:
the GPS receiver is mounted onto an Unmanned Aerial Vehicle.

\* \* \* \* \*